UNITED STATES PATENT OFFICE.

FRÉDÉRIC SILVESTER MASON, OF NEW YORK, N. Y.

SANTALOL COMPOUND.

1,007,587.  Specification of Letters Patent.  Patented Oct. 31, 1911.

No Drawing.  Application filed February 8, 1910.  Serial No. 542,715.  (Specimens.)

*To all whom it may concern:*

Be it known that I, FRÉDÉRIC S. MASON, a citizen of the United States, residing at New York, in the county of New York and State of New York, have invented certain new and useful Improvements in Santalol Compounds; and I do hereby declare the following to be a full, clear, and exact description of the invention, such as will enable others skilled in the art to which it appertains to make and use the same.

My invention relates to compounds derivable from santalol, and particularly to a new condensation product of santalol and lactic acid.

Santalol is the principal active medicinal ingredient in sandalwood oil, the value of the commercial sandalwood oil for medicinal purposes varying usually practically with its contents of santalol to which the formula of $C_{15}H_{25}OH$ is ascribed. The best sandalwood oil contains about 90% of santalol and it will be understood that in the practical carrying out of my invention, sandalwood oil may be used instead of the santalol itself.

I am aware that hitherto a number of esters and compounds of santalol have been made by heating santalol with acid anhydrids or by treating santalol halogen compounds with alkoxids or by the other methods by which esters of organic alcohols may be produced. I am not, however, aware of any compound of lactic acid and santalol ever having been made previous to my discovery and the manner of producing such a compound is here set forth.

I take approximately 80 parts of lactic acid of a specific gravity of 1.200 and add thereto about 55 parts of sandalwood oil containing at least 90% santalol. This is placed in a distilling flask and heated under a reduced atmospheric pressure from 5 to 8 hours at a temperature not to exceed 140 degrees C. The vacuum employed varies from 1/250 of an atmosphere to 1/12 of an atmosphere.

At a temperature of 110 to 122 degrees C. according to the reduction in pressure under which the process is carried on, a reaction occurs lasting for several minutes but during this reaction the thermometer remains fairly constant. At the expiration of this reaction, the temperature gradually rises until a second and more marked reaction occurs at a temperature approximately 20 degrees C. above the first reaction. It is also possible to proceed by first subjecting U. S. P. lactic acid to heat sufficient to drive off the water contained in same, in which process lactic anhydrid is probably produced and then adding about one half or one third the weight of sandalwood oil to the lactic acid and heating at a temperature of about 130 degrees C. for 6 to 8 hours. The first reaction when the lactic acid and sandalwood oil are mixed and heated seems to be the loss of water from the lactic acid, the second and principal reaction taking place at the higher temperature of from 130 to 140 degrees being the reaction between the lactic radical and the santalol; whichever method be used, the product is washed with warm water to free the same from the bitter lactic anhydrid and traces of free lactic acid and is then boiled with water for several hours in order to decompose any free lactic anhydrid remaining in the product which would render the lactate of santalol bitter if allowed to remain therein, the lactic anhydrid being converted into lactic acid by continuous boiling. The product is then further purified by washing with a weak sodium bicarbonate solution not exceeding 3% in strength, then with weak hydro-chloric acid solution not exceeding 2% in strength and then washed with warm water until free from traces of chlorids. The product is then dried over desiccated calcium sulfate or in any other proper manner. The product thus obtained is a liquid of reddish brown color with a boiling point of about 250 to 260 degrees C. under a pressure of about 1/12 of an atmosphere, has a specific gravity of about 1.030 to 1.040 has a neutral reaction, has a somewhat bitter and slightly acidulous taste, is soluble in alcohol, ether, chloroform, acetone, bisulfid of carbon and carbon tetrachlorid but is insoluble in water. It has a pleasing but peculiar odor different from either of the constituents from which it is derived.

The lactate of santalol is capable of medicinal use in all cases where sandalwood oil or pure santalol is now prescribed but on account of its combination with lactic acid, forms an agreeable method of administering santalol with the additional therapeutic effect of the lactic acid. The usual dose is 25 centigrams.

That I have produced a true compound of santalol and lactic acid is ascertainable from the fact that the lactic acid and santalol may be recovered from this compound by its decomposition by appropriate means.

The principal reaction taking place in the formation of this compound is probably as follows:—

$$\underset{\text{Lactic acid.}}{CH_3CHOHCOOH} + \underset{\text{Santalol.}}{C_{15}H_{25}OH} = \underset{\text{Lactate of santalol.}}{CH_3CHOHCOOC_{15}H_{25}} + \underset{\text{Water.}}{H_2O}$$

I have found it necessary in practice to use a considerable excess of lactic acid for the reason that the lactic acid commercially obtainable is not solely pure lactic acid and on account of the readiness with which lactic acid decomposes at various temperatures.

By the foregoing method, I have been enabled to produce a compound of lactic acid and santalol without the necessity of employing any intermediate products, though on account of difficulties inherent in dealing with nearly all lactic acid compounds, I have not been able to isolate the lactate of santalol in an absolutely pure state.

What I claim is:—

1. A compound of lactic acid and santalol having substantially the formula $$CH_3CHOHCOOC_{15}H_{25}.$$

2. A compound of lactic acid and santalol which is a liquid of reddish brown color, has a specific gravity of 1.030 to 1.040, has a boiling point of 250 to 260 degrees C. under reduced atmospheric pressure, has a neutral reaction, is insoluble in water, and soluble in organic solvents.

In testimony whereof I affix my signature in presence of two witnesses.

FRÉDÉRIC SILVESTER MASON.

Witnesses:
  M. SCHAUF,
  HUGO MOCK.

---

Copies of this patent may be obtained for five cents each, by addressing the "Commissioner of Patents, Washington, D. C."